(12) United States Patent
Müller et al.

(10) Patent No.: US 7,284,473 B2
(45) Date of Patent: Oct. 23, 2007

(54) FASTENING ELEMENT AND ADAPT CYLINDER COVER OF A FLUID-ACTUATED WORKING CYLINDER

(75) Inventors: Gerald Müller, Stuttgart (DE); Albrecht Wagner, Winterbach (DE)

(73) Assignee: Festo AG & Co., Esslingen (DE)

( * ) Notice: Subject to any disclaimer, the term of this patent is extended or adjusted under 35 U.S.C. 154(b) by 104 days.

(21) Appl. No.: 10/552,128

(22) PCT Filed: Feb. 14, 2004

(86) PCT No.: PCT/EP2004/001407

§ 371 (c)(1),
(2), (4) Date: Oct. 5, 2005

(87) PCT Pub. No.: WO2004/094837

PCT Pub. Date: Nov. 4, 2004

(65) Prior Publication Data

US 2006/0254417 A1 Nov. 16, 2006

(30) Foreign Application Priority Data

Apr. 24, 2003 (DE) .......................... 203 06 379 U

(51) Int. Cl.
*F15B 15/14* (2006.01)
*F16J 13/00* (2006.01)
(52) U.S. Cl. .......................................... 92/118; 92/161
(58) Field of Classification Search ................. 92/118, 92/146, 161, 169.1; 403/163
See application file for complete search history.

(56) References Cited

U.S. PATENT DOCUMENTS

| | | | | |
|---|---|---|---|---|
| 557,294 A | * | 3/1896 | Westinghouse .............. | 92/118 |
| 2,194,374 A | * | 3/1940 | Wunsch ........................ | 92/118 |
| 2,604,075 A | * | 7/1952 | Naud ............................ | 91/362 |
| 2,854,958 A | * | 10/1958 | Wood et al. .................. | 92/118 |
| 3,429,234 A | | 2/1969 | Taylor .......................... | 92/161 |
| 3,635,127 A | * | 1/1972 | Wagstoff ...................... | 92/161 |
| 3,688,646 A | * | 9/1972 | Flick et al. ................... | 92/161 |
| 3,785,252 A | * | 1/1974 | Cornair ........................ | 92/161 |
| 3,967,539 A | * | 7/1976 | Williamson .................. | 91/404 |
| 4,020,745 A | * | 5/1977 | Iijima et al. .................. | 92/161 |
| 4,044,631 A | * | 8/1977 | Matousek et al. ............ | 92/161 |
| 4,312,264 A | * | 1/1982 | Nunnemacher et al. ....... | 92/161 |
| 4,326,749 A | * | 4/1982 | Bender ........................ | 92/118 |

(Continued)

FOREIGN PATENT DOCUMENTS

DE  1 932 116  1/1970

(Continued)

*Primary Examiner*—Thomas E. Lazo
(74) *Attorney, Agent, or Firm*—Hoffman & Baron, LLP

(57) ABSTRACT

An attachment element (12) for the selective pivotal and/or fixed bearing of a power cylinder, comprising a base region (33) having attachment means (45) for its attachment on a support structure (35) and from which two attachment arms (32) extend opposite each other with a distance between them, the attachment arms (32) being provided with bearing means (29) for a pivotal bearing engagement on oppositely placed sides of the outer periphery of the power cylinder (10). The base section (33) is designed with bearing means (41) for any additional terminal interlocking bearing engagement with the power cylinder (10) as may be required. Furthermore a cylinder end cap is proposed matching the attachment element (12).

21 Claims, 5 Drawing Sheets

U.S. PATENT DOCUMENTS 5,237,909 A * 8/1993 Pirhadi .................. 92/161
5,934,171 A * 8/1999 Thompson ............... 92/161
6,805,038 B2 * 10/2004 Albright .................. 92/118

FOREIGN PATENT DOCUMENTS

| DE | 2 232 790 | 2/1973 |
| DE | 29 12 432 | 10/1980 |
| EP | 0994 260 A2 | 4/2000 |
| GB | 1289 957 | 9/1972 |

* cited by examiner

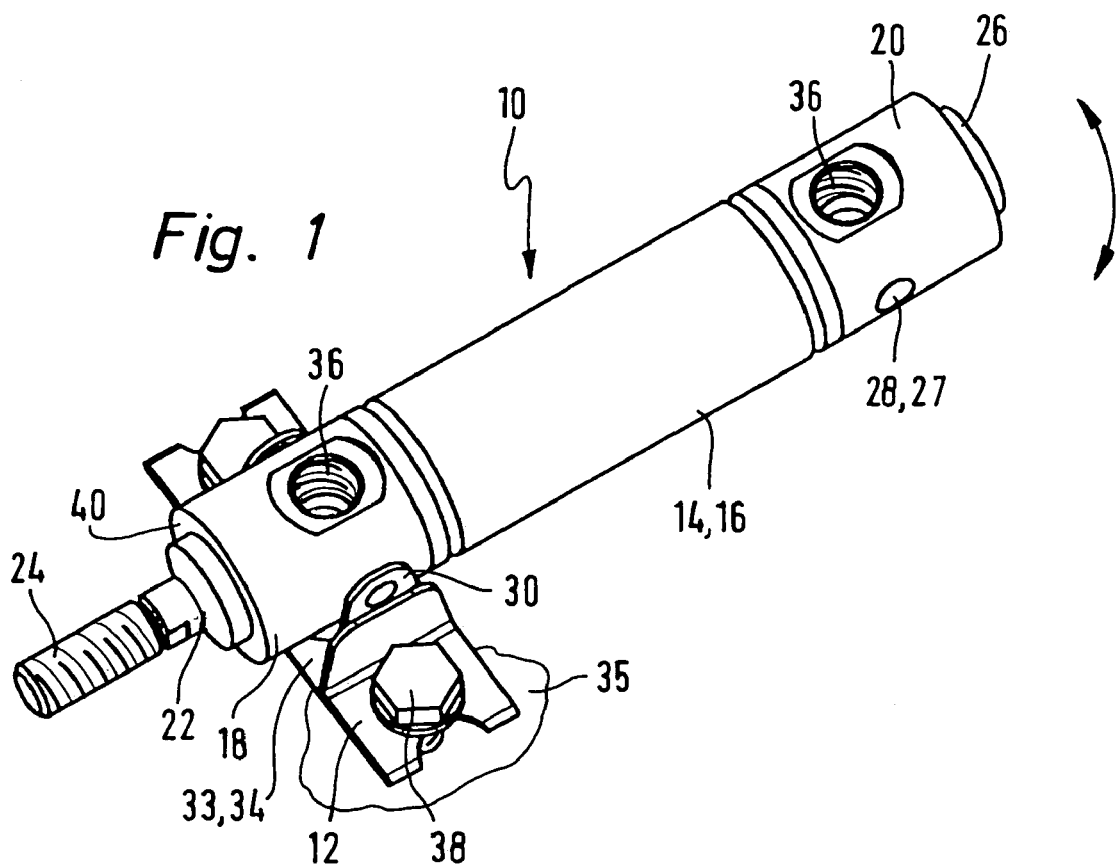
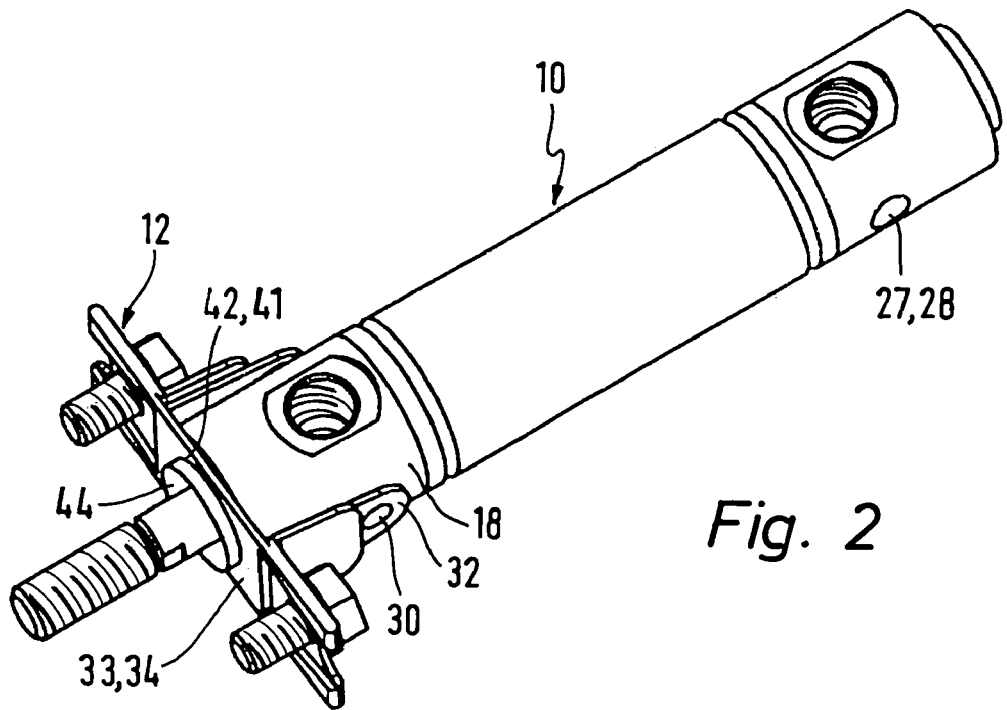

FASTENING ELEMENT AND ADAPT CYLINDER COVER OF A FLUID-ACTUATED WORKING CYLINDER

FIELD OF THE INVENTION

The invention relates to an attachment element for selectively bearing a fluid operated power cylinder and furthermore to a cylinder end cap matching such an attachment element.

BACKGROUND OF THE INVENTION

Fluid operated power cylinders comprise a cylinder space to be subjected to pneumatic or hydraulic pressure, in which a piston slides having a piston rod arranged thereon. The cylinder housing is in most cases a cylinder barrel and two terminal cylinder end caps secured to it. During use the power cylinder is rigidly or pivotally borne on its housing.

For the attachment and bearing of such fluid operated power cylinders basically three different types of attachment are more particularly suitable. In the case of a so-called foot attachment the cylinder is fixed with a lateral orientation at both end regions. In the case of a so-called pivotal attachment there is a bearing means only at one end so that pivoting is possible about an axis extending athwart the thrust direction of the cylinder. In the case of the so-called flange attachment the cylinder is attached at the back and/or at the front with an axial orientation. In the case of the foot and the flange attachment the cylinder is rigidly mounted, whereas in the case of the pivotal mode of attachment it is able to be moved pivotally.

All three different types of attachment have so far required different attachment means. The attachment means may be an integral part of the cylinder housing and/or able to be connected with same or, respectively, be able to be connected on same. A disadvantage is the lack of general applicability of the attachment means, which dependent on the type of attachment may partly be extremely different in structure.

SUMMARY OF THE INVENTION

One object of the present invention is to provide a widely applicable possibility of attachment for a power cylinder, which selectively offers various different types of attachment.

This object is to be achieved using an attachment element for selectively offering pivotal and/or fixed mounting of a power cylinder, comprising a base region having attachment means for its attachment on a support structure and from which two attachment arms extend opposite each other with a distance between them, the attachment arms being provided with bearing means for a pivotal bearing engagement on oppositely placed sides of the outer periphery of the power cylinder and the base section is designed with bearing means for any additional terminal interlocking bearing engagement with the power cylinder as may be required.

Furthermore the object of the invention is to be achieved by a cylinder end cap of a power cylinder, said end cap being designed to function as a bearing on such an attachment element, comprising first bearing means on oppositely placed sides of the outer periphery of the cylinder end cap and an axial through hole, said hole being prepared for the selective bearing of a piston rod or receiving a plug, and which opens in a centering projection on an outer terminal side of the cylinder end cap, the first bearing means having second bearing means, for connection with attachment arms of the attachment element, and the centering projection having third bearing means for connection with the base region of the attachment element.

An attachment element in accordance with the invention for selectively offering pivotal and/or fixed mounting of a power cylinder has a base region with attachment means for stationary attachment and, arranged thereon, attachment arms for bearing the power cylinder at both sides at the outer periphery thereof. Moreover, the base section is designed for an additional terminal interlocking and more particularly plug-in bearing function on the power cylinder, which may be relied upon if necessary. The attachment element accordingly renders possible variable bearing of the power cylinder, same being able to be secured selectively by means of a pivotal attachment, a flange attachment or a foot attachment and/or pivotally borne. For a foot attachment preferably two attachment elements are provided, which are attached with a space between them and in which the power cylinder is secured with the respective attachment arms. The degrees of freedom inherently present are suppressed by this paired arrangement. Using only one single design of an attachment element it is therefore possible to have different types of attachment of a power cylinder so that the work necessary for manufacture and fitting may be substantially reduced as compared with conventional types of attachment.

Features of advantageous further developments of the invention will be seen from the dependent claims.

Preferably first bearing means are provided on the power cylinder preferably in the form of receiving means, recesses or blind holes or the like. Second bearing means may fit into such first bearing means in a rotatable manner and be provided on the free ends of the attachment arms as pins, pegs or trunnions or the like. In a selective manner the first bearing means may be formed on the power cylinder also in the form of pins or pegs, whereas the second bearing means are formed on the attachment arms of the attachment element as receiving means or, respectively, recesses. The important point is that the first and second bearing means are respectively designed in a complementary fashion so that a fixed and/or pivotal bearing of the power cylinder is possible.

A preferred embodiment is such that the attachment arms are secured in a resiliently elastic manner on the base region of the attachment element so that the second bearing means may be fitted without any trouble by means of a detent connection into the first bearing means of the power cylinder. After the snapping into position of the bearing means the attachment element may be separated from the power cylinder again preferably only by thrusting the attachment arms apart.

By means of the first and second bearing means we already have widely applicable possibilities of attachment and/or bearing for the power cylinder. In the case of the use of one attachment element the power cylinder may be pivoted about a pivot axis extending through the bearing means. Such a bearing function is equivalent to a so-called pivotal bearing of the power cylinder in which the power cylinder is able to be pivoted about an axis running perpendicularly to the thrust direction of a piston rod of the power cylinder. The attachment element is in this case to the side on the power cylinder. If two attachment elements are employed then the power cylinder may be rigidly mounted by suppression of the degrees of freedom of the bearing structure. The attachment elements are in this case spaced apart from each other. More particularly, they can be able to be attached to opposite end sections of the power cylinder. This type of bearing structure corresponds to a so-called foot attachment.

In accordance with a further design of the invention third bearing means are provided on the attachment element to fix a free end of the power cylinder in position and more especially for the engagement of a centering projection of the power cylinder, which is best located on a cylinder end cap. On engagement of the centering projection in the third bearing means the first and the second bearing means are also simultaneously in engagement with one another so that using only a single attachment element there is all in all a rigid support or bearing for the power cylinder.

More especially, it is possible for the third bearing means to be it the form of an opening or centering hole or the like, which may be provided for engagement with a cylindrically and/or conically designed centering projection arranged at an end of the power cylinder. Preferably identical centering projections are provided at both ends of the power cylinder so that the attachment element may selectively mounted on one of the two sides and accordingly can serve as a so-called flange attachment. Dependent on the space available for mounting the flange attachment can also be provided on both sides so that there is a particularly stable anchoring of the power cylinder. Owing to the design of the third bearing means in the form of a through opening the attachment element can also be attached on a front side of the power cylinder, from which a sliding piston rod extends.

Moreover, in the base region attachment means and more particularly through openings, can be provided to receive attachment screws. Accordingly the attachment element may be secured at any desired position on a suitable support structure, for example the frame of a machine.

A preferred embodiment of the invention is such that the attachment element is integral in structure. It may more particularly be manufactured as a stamped and bent part starting with metallic flat material, for example spring steel. In this case the attachment element may be produced using a stamping and bending operation. For the production firstly a centering hole is made in the base region. Furthermore outlines of the attachment arms may be stamped and the attachment arms bent perpendicularly so that they are respectively anchored by an angled foot region of the attachment element. Such an attachment element may be simply and economically produced. The integral design furthermore ensures the necessary stability together with relatively small dimensions. The first bearing means of the power cylinder may be connected with the second bearing means of the attachment element by temporary thrusting apart of the resiliently elastic attachment arms as a detent connection.

Furthermore support lugs can be provided, using which the attachment arms are secured following their connection with the power cylinder to prevent their being drawn apart. The support lugs are more particularly produced by bending to an angle of oppositely placed free ends of the base region. They can be thrust against outer sides of the attachment arms after the first and the second bearing means have snapped into position. Preferably, the support lugs are secured in position, after assembly of the attachment elements by means of the attachment means, by the latter so that the connection between the power cylinder and the attachment element is held against being released.

A cylinder end cap in accordance with the invention of a power cylinder preferably possesses an axial through hole, which is prepared selectively for bearing and guiding a piston rod of the power cylinder and for receiving a closure plug. The axial through hole opens into a centering projection on an outer end side of the cylinder end cap. Furthermore on a peripheral face of the cylinder end cap, on mutually opposite sides, first bearing means are provided. Accordingly the cylinder end cap is suitable for connection with an attachment element in accordance with the previously described embodiments since it is able to be coupled with second and/or third bearing means arranged on it.

The cylinder end cap may be mounted on either side of the cylinder barrel and serves in one form thereof as a bearing end cap rendering possible a pressure-tight closure and a guide for the piston rod, while in another form it serves as a terminal cap arranged on the other end, in the case of which the cylindrical axial through hole is closed by a cap or, respectively, a plug in a pressure-tight fashion.

The plug may for example be located in position by screwing in or by swaging in the axial through hole.

Such a cylinder end cap is, with a slight modification of assembly steps, suitable for the one or the other purpose and in principle may be interchanged in any way desired.

In the following preferred embodiments will be described with reference to the accompanying drawings in detail.

BRIEF DESCRIPTION OF THE DRAWINGS

FIG. 1 is a perspective representation of a power cylinder borne at one end by means of an attachment element.

FIG. 2 shows a possible modification of bearing means for the power cylinder.

DETAILED DESCRIPTION OF THE PREFERRED EMBODIMENTS

Figure 3:
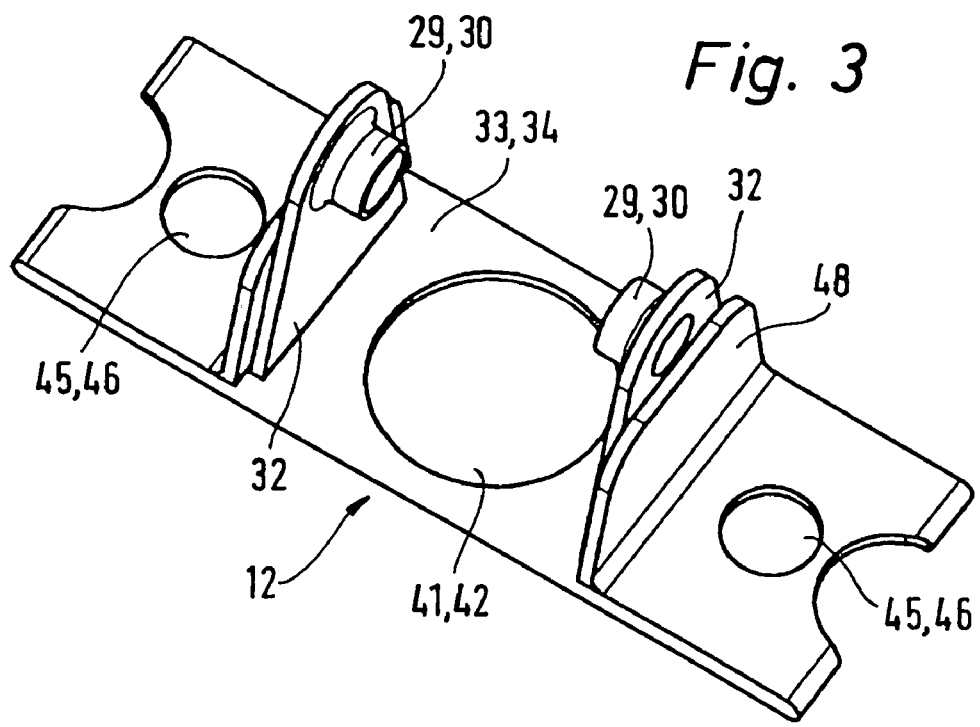
FIG. 3 is a diagrammatic perspective showing of an attachment element in accordance with the invention.

FIG. 1 shows a power cylinder 10 which is borne on the peripheral face of a cylinder housing 14 by means of an attachment element 12 in accordance with the invention. The power cylinder 10 comprises essentially a cylinder barrel 16, on whose two ends cylinder end caps, 18 and 20 respectively, are attached. The cylinder end caps 18 and 20 may for example be attached to the cylinder barrel 16 at the ends by screw threads and/or a press fit and/or by swaging or crimping.

A front cylinder end cap 18 possesses a tubular opening 22 for the passage of a piston rod 24 of the power cylinder 10 functioning as a single or double acting linear drive. In the case of an essentially identically designed rear cylinder end cap 20 the opening 22 is closed by a screwed in or otherwise secured plug 26. On opposite sides of the cylindrical peripheral faces of the cylinder end caps 18 and 20 the reader will see round receiving means 28 functioning as first bearing means 27, into which corresponding fitting trunnions 30 may fit in a rotatable manner and which are arranged on attachment arms 32 functioning as second bearing means 29. The attachment arms 32 are arranged on a base plate 34 defining a base region 33, of the attachment element 12 and are perpendicular to same and parallel to one another.

Furthermore on the cylinder end caps 18 and 20 there are fluid connections or ports 36 for the action of a fluid pressure medium. The front and rear cylinder end caps 18 and 20 are essentially the same in structure and may be exchanged with slight modifications. A detailed representation of the structure of the power cylinder 10 will be explained with reference to the longitudinal section in FIG. 9.

The representation of FIG. 1 shows a single ended bearing means for the front cylinder end cap 18 using an attachment element 12, something which provides a pivotal mounting of the power cylinder 10. The power cylinder 10 can be pivoted at the trunnions 30 of the attachment element 12 in relation to the laterally arranged attachment element 12, something which is indicated by the arrow at the rear cylinder end cap 20. The attachment element 12 itself with its base plate 34 can be screwed by means of its base plate 34 at some suitable installation position to a suitable support structure 35. For this purpose two attachment holes 46, functioning as attachment means 45, are provided, through which respective hex screws 38 in accordance with the illustrated design.

FIG. 2 shows an alternative possibility of attachment for the power cylinder. In this case the attachment element 12 is turned through 90 degrees in relation to the arrangement of FIG. 1 so that the base plate 34 partially covers an end face 40 (see FIG. 1) of the front cylinder end cap 18. In the middle of the base plate 34 of the attachment element 12 a centering hole 42, functioning as a third bearing means 41, is provided whose diameter is such that a centering projection 44 of the end face 40 of the front cylinder end cap 18 may be inserted into it in an interlocking manner. The attachment element 12 is accordingly seated with an axial orientation on the power cylinder 10 and is secured by the additional bearing means on the power cylinder 10 without being able to be turned.

Figure 7:
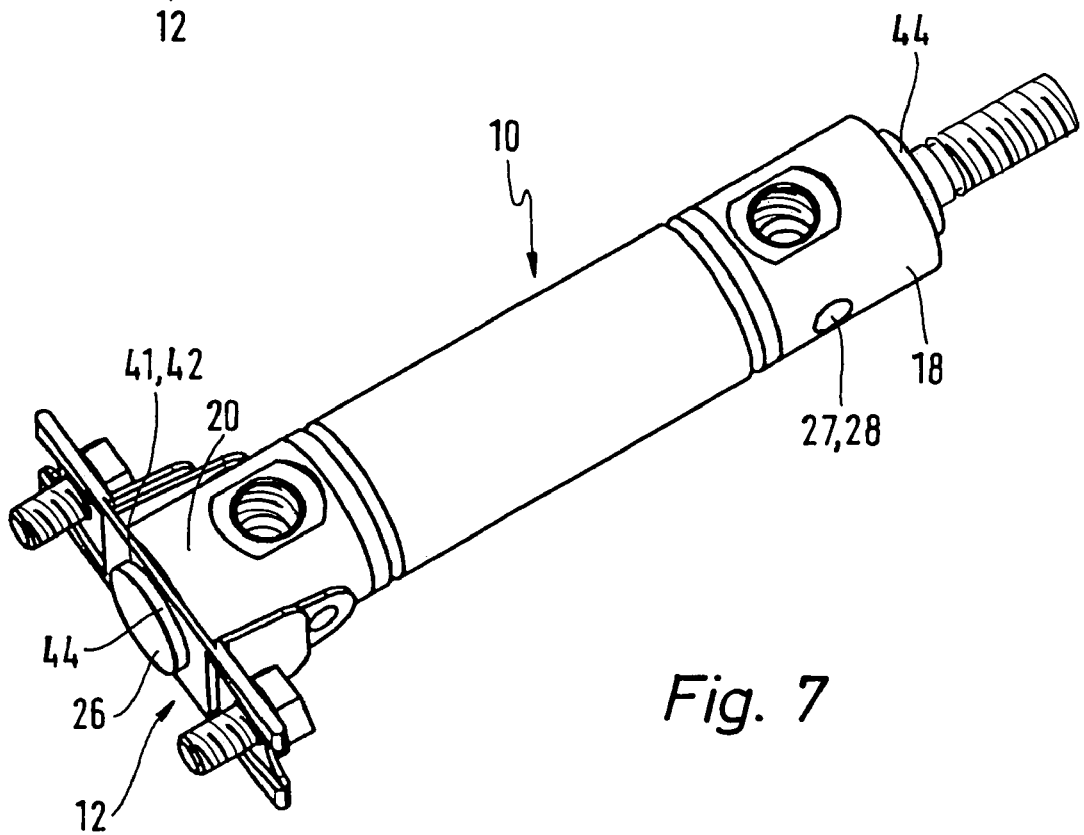

The centering projections 44 on the front and on the rear cylinder end cap 18 and 20 each have the same outer diameter so that the attachment element 12 may be mounted as may be desired on the front and/or on the rear cylinder end cap 18 and 20 for flange mounting (see FIG. 7). The length of the attachment arms 32 and the distance of the trunnions 30 from the base plate 34 are to be of such a size that the base plate 34 may engage the end face 40 of the cylinder end cap 18 or respectively 20 free of play, while the centering projection 44 fits into the centering hole 42 substantially free of play too.

FIG. 3 shows the attachment element 12 in a perspective representation. The attachment element 12 is preferably manufactured of stamped and bent steel sheet, spring steel or the like. The base plate 34 with the centering hole 42 arranged in the middle thereof possesses an elongated rectangular form. Adjacent to the two narrow sides attachment holes 46 are provided for the insertion of screws 38. Between the centering hole 42 and the attachment holes 46 a respective attachment arm extends perpendicularly from the base plate 34 in an outward direction so that the two attachment arms are parallel and are opposite to each other. At the opposite inner sides of the attachment arms 32 there are the trunnions 30 arranged thereon, which may be inserted in the corresponding receiving means 28 on the cylinder end caps 18 and 20 in order to provide a movable or fixed bearing function for the power cylinder 10 at one or two attachment elements 12.

The attachment arms 32 are additionally stiffened respectively by a support lug 48, whose function will be described in more detail with reference to FIGS. 4 and 5.

Figure 4:
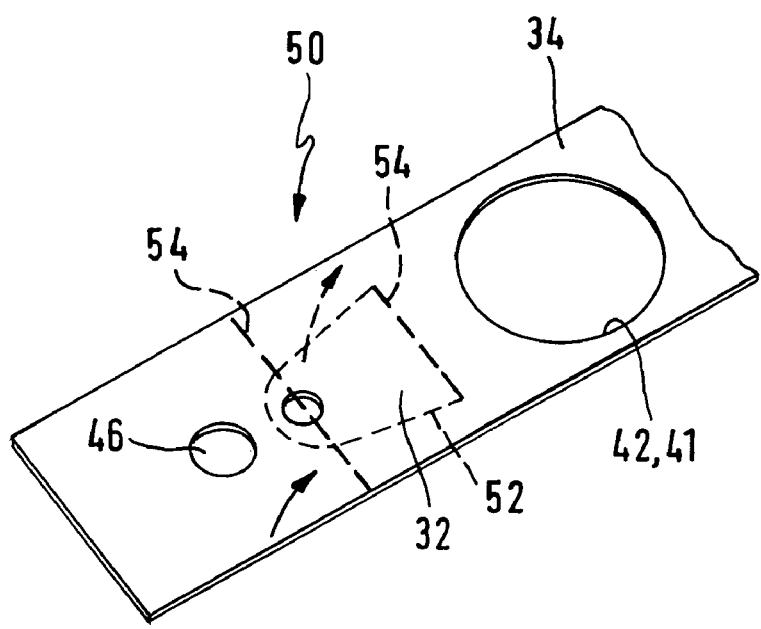
FIG. 4 shows sheet material for the production of an attachment element by stamping and bending.
Figure 5:
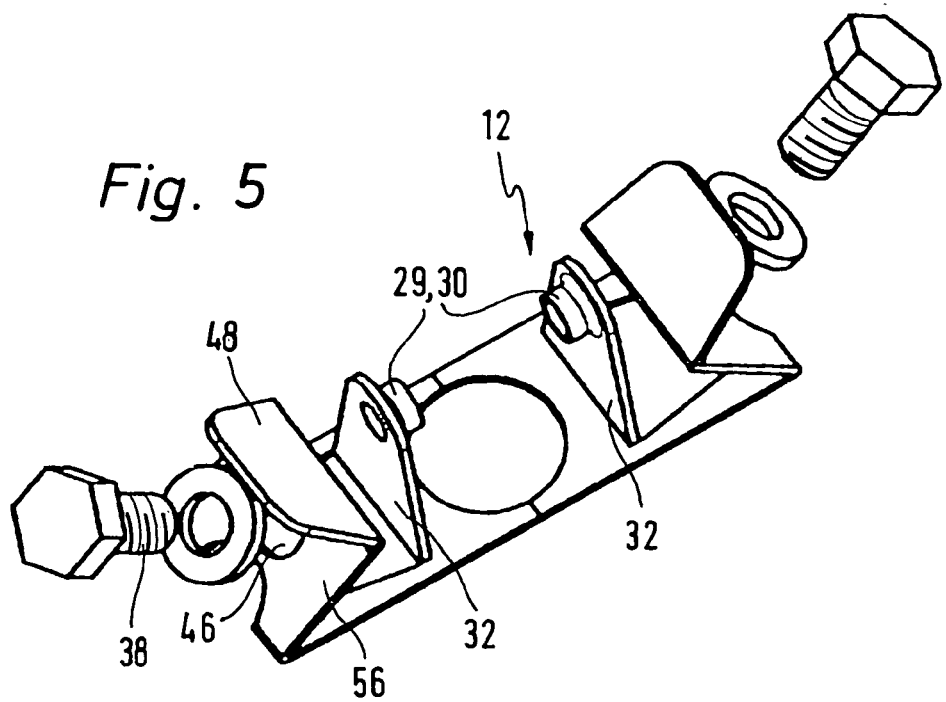
FIG. 5 shows an attachment element prior to its connection with the power cylinder.

FIG. 4 shows a rectangular sheet metal element 50, which for example may consist of a strip of spring steel. It has a centering hole 42 stamped in it.

Furthermore an interrupted line will be seen, which represents a stamping line 52 constituting the outline of the attachment arm 32, which is to be bent upward. The bending lines 54 are represented in the form of thicker interrupted lines. A first bending line 54 constitutes a connection region between a foot region of the attachment arm 32 and the base plate 34 of the attachment element 12. Following perpendicular bending of the attachment arm 32 in the arrowed direction an end section 56 of the sheet metal 50 is bent to thus constitute a support lug 48 for the attachment arms 32 arranged resiliently on the base plate 34.

The fitting of the attachment element 12 on the front or rear cylinder end cap 18 or, respectively, 20 is performed by thrusting the resilient attachment arms 28 until their trunnions 30 snap into the corresponding receiving means 28 on the cylinder peripheral faces of the cylinder end caps 18 and, respectively, 20. The attachment element 12 is then shifted into the respectively desired position. This may be a pivotal position in accordance with FIG. 1 or a flange attachment in accordance with FIG. 2. Then the end sections 56 are so bent with the already bent support lugs 48 in accordance with FIG. 5 toward the attachment arms so that the support lugs 48 engage their outer sides, with which they are flush, facing away from the each other so that a bending apart of the attachment arms is prevented. The attachment element 12 is in this manner permanently connected with the power cylinder 10. Then the screws 38 may be inserted through the attachment holes 12 at a desired position and tightened. It is only when the screws 38 are tightened that the end sections are so fixed in position that the support lugs 48 are thrust against the outer sides of the attachment arms 32 and prevent same from being bent apart.

Figure 8:
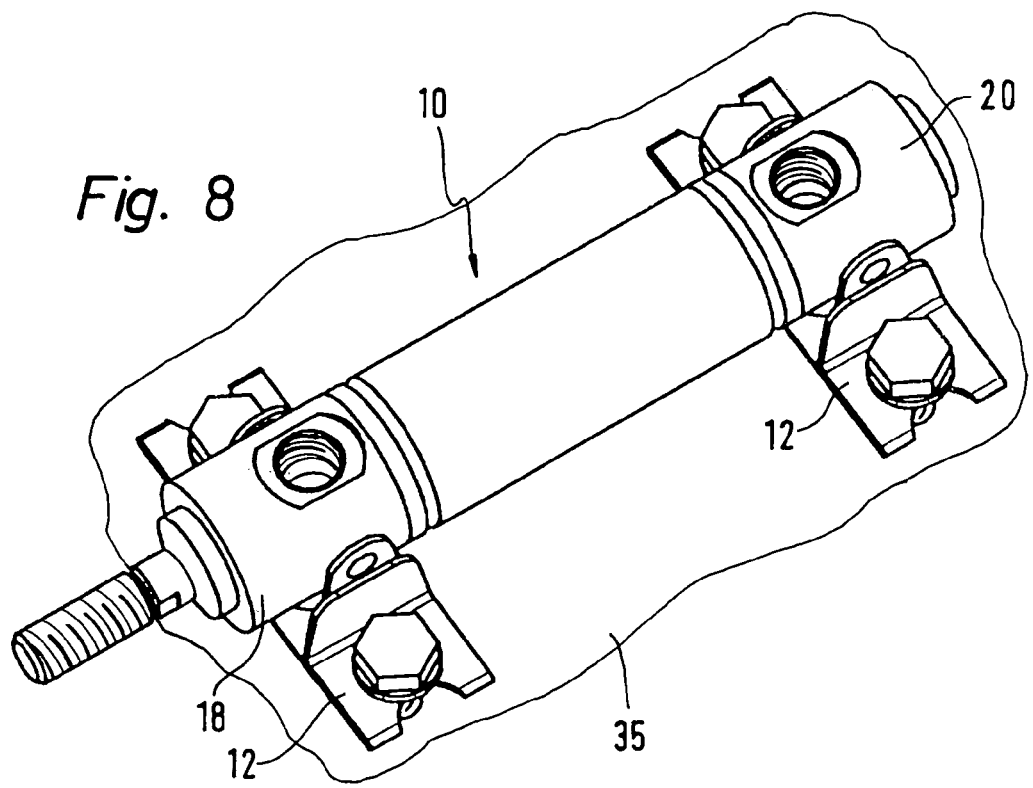
FIGS. 6 through 8 show further alternative forms of bearing the power cylinder.
Figure 6:
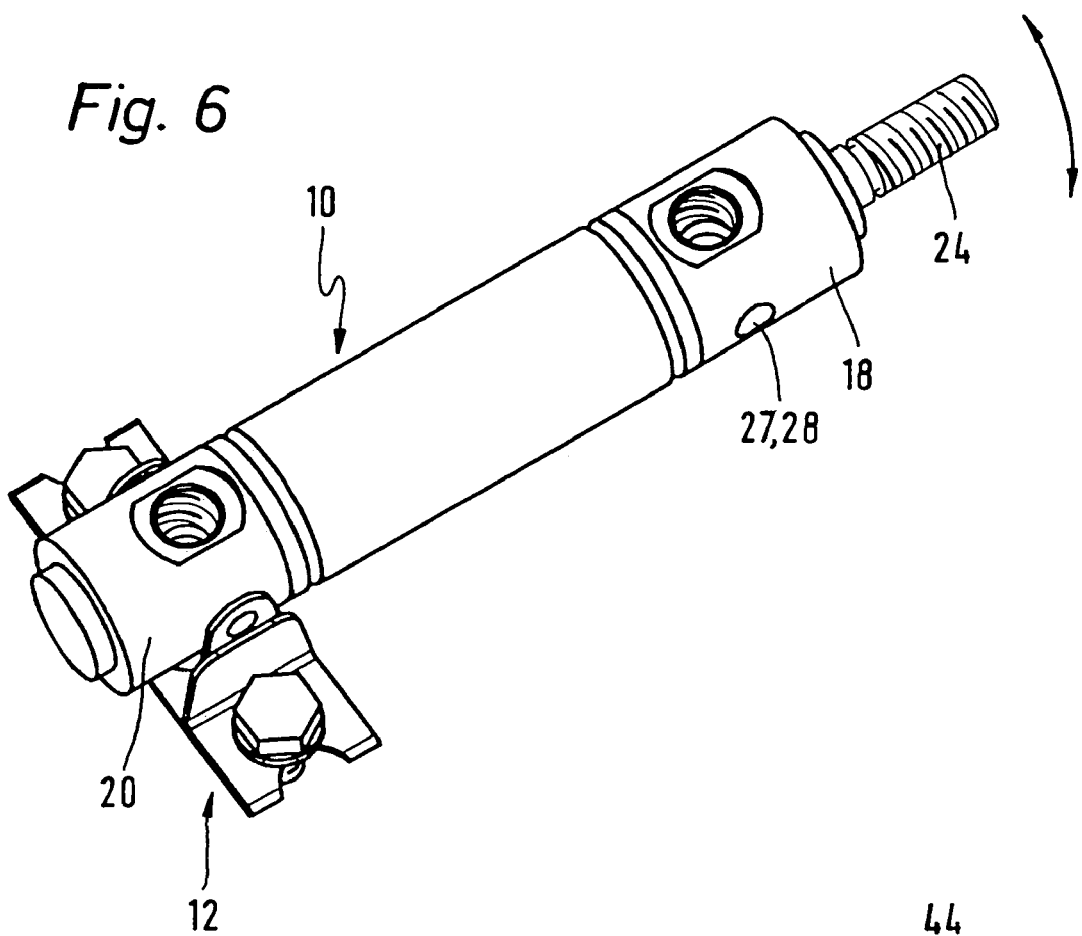

FIGS. 6 through 8 show alternative possibilities of attachment for the power cylinder 10 with at least one or, respectively, two attachment elements 12 in accordance with the invention.

Thus FIG. 6 shows a pivotal attachment arrangement in accordance with FIG. 1 but with the difference that in this case the power cylinder 10 is attachment by means of its rear cylinder end cap 20 in a pivotal fashion on the attachment element 12. In the case of this design of the pivotal attachment the front end of the power cylinder 10 together with the protruding piston rod 24 is able to be turned in the arrowed direction about the bearing receiving means of the attachment element 12.

In turn FIG. 7 shows a non-pivotal rigid flange attachment in accordance with FIG. 2, in which case the attachment element 12 is arranged in an axial extension of the rear cylinder end cap 20 so that the centering projection 44 together with the plug 26 inserted into it snaps into the attachment hole 46 in the attachment element 12. In this case the power cylinder 10 can not pivot, as is also the case with the flange attachment in accordance with FIG. 2.

FIG. 8 furthermore shows a so-called foot attachment or mounting for the power cylinder with two attachment elements 12 arranged respectively on the front and on the rear cylinder end cap 18 and 20. The attachment is in accordance with that illustrated in FIGS. 1 and 6 with the difference that in this case pivoting of the power cylinder is prevented by a second attachment element 12. As an alternative to this a design would be possible in which the front cylinder end cap 18 is held by means of the attachment element 12 in accordance with FIG. 8, whereas the rear cylinder end cap 20 has a flange attachment according to FIG. 7, or vice versa.

Figure 9:
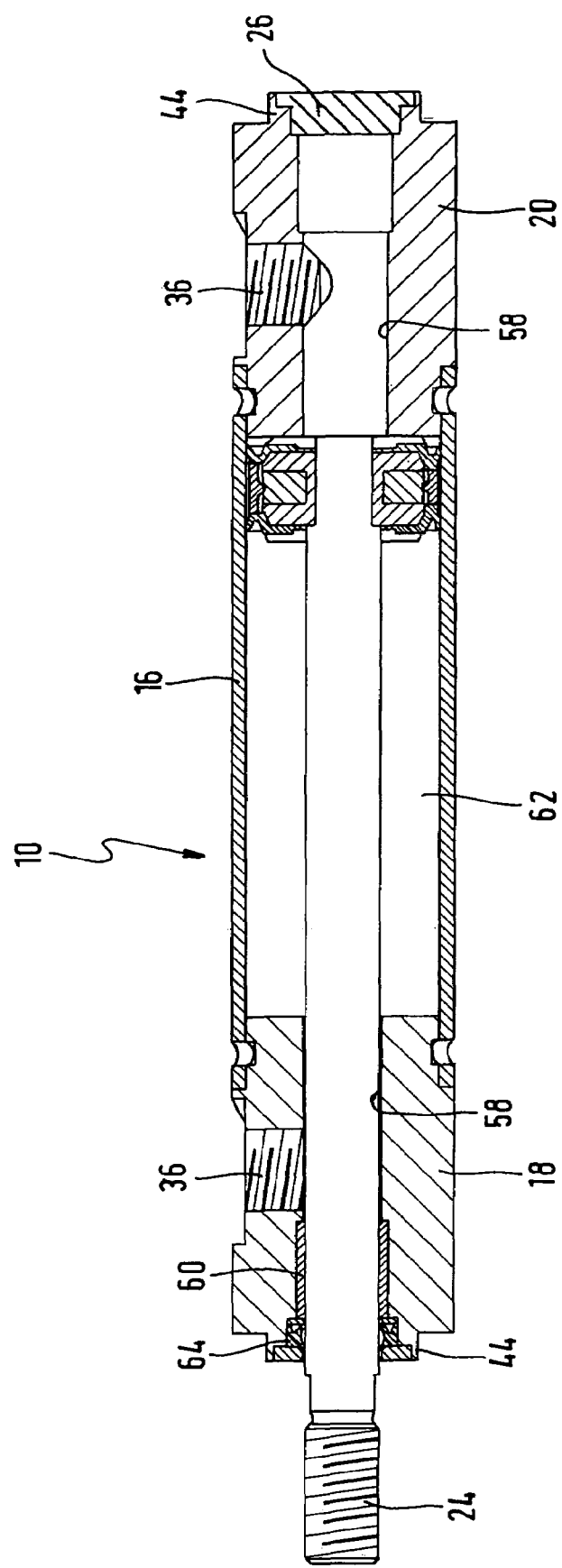
FIG. 9 shows a diagrammatic longitudinal section to indicate the structure of a power cylinder.

Finally FIG. 9 is a diagrammatic longitudinal section of the structure of the cylinder housing 14. The cylinder housing 14 is formed by the tubular cylinder barrel 16 and also by the cylinder end caps 18 and 20 terminally connected with it. The two cylinder end caps 18 and 20 are essentially identical in form and are able to be interchanged with slight modifications. The rear cylinder end cap 20 is sealed in pressure-tight manner at the end of a through hole 58 by means of a plug 26, which is for example screwed, press-fitted, crimped or held in the through hole 58 in some other way. The plug 26 is inserted into a centering projection 44 corresponding to the centering projection 44 of the front cylinder end cap 18. The through hole 58 in the front cylinder end cap 18 is open to receive a piston rod 24 which can slide in it. In the vicinity of the opening a guide bushing 60 is provided to axially and radially bear the piston rod 24 so that it runs freely.

A pressure space 62 within the cylinder housing 14 may be put under hydraulic or pneumatic pressure by means of the fluid ports 36 so that a linear movement of the piston rod 24 may be caused. Furthermore a seal and a stripper 64 will be seen on the centering projection 44 of the front cylinder end cap 18 so that the pressure space 62 is sealed off from the outside. Externally on the peripheral faces of the cylinder end caps 18 and 20 the first bearing means 27 are provided to cooperate with corresponding second bearing means 29 on the attachment arms 32 of the attachment element 12 to provide a detent connection or catch. From FIG. 9 it will be seen that the substantially identical cylinder end caps 18 and 20 render possible a universal bearing function for the power cylinder 10 using only one type of attachment elements 12.

The attachment elements 12 in accordance with the invention are suited for a universal bearing function for a power cylinder in accordance with FIGS. 1, 2 and 6 through 8.

The invention claimed is:

1. An attachment element for the selective bearing of a fluid operated power cylinder in a pivotal and/or fixed manner, comprising a base region having attachment means for its attachment on a support structure and from which two attachment arms extend opposite each other with a distance between them, the attachment arms being provided with bearing means for a pivotal bearing engagement on oppositely placed sides of the outer periphery of the power cylinder and the base section is designed with bearing means for any additional terminal interlocking bearing engagement with the power cylinder as may be required.

2. The attachment element as set forth in claim 1, further comprising second bearing means arranged on the attachment arms and connected with first bearing means arranged on oppositely arranged sides of the outer periphery of the housing of the power cylinder.

3. The attachment element as set forth in claim 1, wherein the attachment arms respectively have second bearing means on free ends thereof for bearing the power cylinder.

4. The attachment element as set forth in claim 2 wherein the first bearing means of the power cylinder are designed as receiving means or recesses and the second bearing means of the attachment element are designed in the form of bolts or pins.

5. The attachment element as set forth in claim 2 wherein the first bearing means of the power cylinder are in the form of bolts or pins and the second bearing means of the attachment element are in the form of receiving means or recesses.

6. The attachment element as set forth in claim 1, wherein the attachment arms are arranged in a resiliently elastic manner on the base region.

7. The attachment element as set forth in claim 1, wherein third bearing means are provided in the base region for locking a free end, of the power cylinder.

8. The attachment element as set forth in claim 7, wherein the third bearing means are in the form of a centering hole for interlocking reception of a centering projection on at least one end side of the power cylinder.

9. The attachment element as set forth in claim 1, wherein at least two attachment holes are formed as attachment means on the base region of the attachment element, such holes being arranged clear of the attachment arms.

10. The attachment element as set forth in claim 1, wherein the attachment element is made in one piece.

11. The attachment element as set forth in claim 1, wherein the attachment element consists of metallic flat material.

12. The attachment element as set forth in claim 1, wherein the attachment element is in the form of a stamped and bent part.

13. The attachment element as set forth in claim 1, wherein the attachment arms are respectively anchored by means of an angled foot region of the base region of the attachment element.

14. The attachment element as set forth in claim 1, wherein the first bearing means of the power cylinder are adapted to be connected with the second bearing means of the attachment element by detent action as part of a temporary thrusting apart of the resiliently elastic attachment arms.

15. The attachment element as set forth in claim 14, wherein the attachment arms, following their connection with the power cylinder, are prevented from being thrust apart by bent over support lugs.

16. The attachment element as set forth in claim 15, wherein the support lugs are able to be thrust against the attachment arms by bending and angling of oppositely placed free ends of the base region.

17. The attachment element as set forth in claim 16, wherein the support lugs after fitting the attachment element are held in their position locating the attachment arms in position.

18. An end cap of a power cylinder designed for being borne on an attachment element as set forth in claim 1, comprising first bearing means on mutually oppositely placed sides of the outer periphery of the cylinder end cap, and an axial through hole, which is prepared for selectively bearing a piston rod or receiving a plug and which opens into a centering projection provided at an outer end face of the cylinder end cap, the first bearing means being designed for connection with second bearing means provided on attachment arms of the attachment element and the centering projection is designed for connection with third bearing means provided on the base region of the attachment element.

19. The cylinder end cap as set forth in claim 18, wherein the end cap is designed, in the form of a bearing end cap, the piston rod being able to be borne in the axial through hole, not closed by a plug, for axial sliding movement and with a radial supporting action.

20. The cylinder end cap as set forth in claim 18 wherein the end cap is designed as a terminating cap, the axial through hole being sealed off in a pressure-tight fashion by means of the inserted plug.

21. The cylinder end cap as set forth in claim 20, wherein the plug is able to be secured in position by means of a screw or crimp connection in the through hole.

* * * * *

UNITED STATES PATENT AND TRADEMARK OFFICE
CERTIFICATE OF CORRECTION

PATENT NO. : 7,284,473 B2  Page 1 of 1
APPLICATION NO. : 10/552128
DATED : October 23, 2007
INVENTOR(S) : Gerald Muller et al.

It is certified that error appears in the above-identified patent and that said Letters Patent is hereby corrected as shown below:

IN THE SPECIFICATION:

Column 3, line 15,  now reads "third bearing means to be it the form"
should read --third bearing means to be in the form--

Signed and Sealed this

Twenty Second Day of April, 2008

JON W. DUDAS
*Director of the United States Patent and Trademark Office*